US012639995B2

(12) United States Patent
Hotta

(10) Patent No.: US 12,639,995 B2
(45) Date of Patent: May 26, 2026

(54) PARKING MANAGEMENT SYSTEM

(71) Applicant: TOYOTA JIDOSHA KABUSHIKI KAISHA, Toyota (JP)

(72) Inventor: Norihisa Hotta, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/986,954

(22) Filed: Dec. 19, 2024

(65) Prior Publication Data

US 2025/0209873 A1 Jun. 26, 2025

(30) Foreign Application Priority Data

Dec. 22, 2023 (JP) ................................ 2023-217038

(51) Int. Cl.

*G07C 9/10* (2020.01)
*G07C 9/00* (2020.01)
*G08G 1/14* (2006.01)

(52) U.S. Cl.

CPC ........... *G07C 9/10* (2020.01); *G07C 9/00896* (2013.01); *G08G 1/149* (2013.01); *G07C 2209/63* (2013.01)

(58) Field of Classification Search

CPC .. G07C 9/10; G07C 9/00896; G07C 2209/63; G08G 1/149; G08G 1/146; G07B 15/04

See application file for complete search history.

(56) References Cited

U.S. PATENT DOCUMENTS

2022/0013013 A1 * 1/2022 Chen ................. G07C 9/00309

FOREIGN PATENT DOCUMENTS

JP 2020-186616 A 11/2020

* cited by examiner

*Primary Examiner* — Daryl C Pope
(74) *Attorney, Agent, or Firm* — Dinsmore & Shohl LLP

(57) ABSTRACT

A parking management system comprises, a parking lock member provided in a parking space; a parking controller configured to manage a reservation to use the parking space; a parking sensor configured to detect presence or absence of the vehicle in the parking space; and an approach sensor configured to detect approach of the vehicle to the parking space, wherein the parking controller is configured to: maintain the parking lock member in a down state even after a first reserved vehicle has left the parking space when it is predicted that switching parking occurs in which a second reserved vehicle enters the parking space immediately after the first reserved vehicle leaves the parking space.

4 Claims, 6 Drawing Sheets

PARKING MANAGEMENT SYSTEM

CROSS REFERENCE TO RELATED APPLICATION

This application claims priority to Japanese Patent Application No. 2023-217038 filed on Dec. 22, 2023, which is incorporated herein by reference in its entirety including the specification, claims, drawings, and abstract.

TECHNICAL FIELD

This specification discloses a parking management system for managing a parking state of a vehicle in a parking space.

BACKGROUND

Conventionally, many techniques for managing a parking state of a vehicle in a parking space have been proposed. For example, the Patent Document 1 discloses a technique of managing a parking state by controlling lifting and lowering of a flap plate installed in a parking space. In the Patent Document 1, the flap plate is raised when parking of a vehicle in a parking space is detected, and the flap plate is lowered when a fee related to the parking is settled. According to such a technique, an unspecified number of users can use a parking space without reservation.

Incidentally, it is conceivable to make the use of the parking space reservation-only. In the case of reservation only, in order to prevent parking of vehicles other than reserved vehicles, it is necessary to raise a parking lock member such as a flap plate during a period in which a parking space is available. Therefore, in the case of the reservation only, the parking lock member is raised immediately when the reserved vehicle leaves the parking space.

However, in this case, if the next reserved vehicle (hereinafter, referred to as a "second reserved vehicle") attempts to enter the parking space immediately after one reserved vehicle (hereinafter, referred to as a "first reserved vehicle") leaves the parking space, the raised parking lock member may become an obstacle, and the second reserved vehicle may not smoothly enter the parking space.

Therefore, this specification discloses a parking management system capable of smoothly performing switching parking in which a second reserved vehicle enters immediately after the first reserved vehicle leaves.

CITATION LIST

PATENT DOCUMENT 1: JP 2020-186616 A

SUMMARY

A parking management system disclosed in this specification comprises a parking lock member provided in a parking space and configured to be changeable between an up state in which entry of a vehicle is inhibited and a down state in which the entry of the vehicle is permitted; a parking controller configured to manage a reservation to use the parking space and to control a state change of the parking lock member; a parking sensor configured to detect presence or absence of the vehicle in the parking space; and an approach sensor configured to detect approach of the vehicle to the parking space, wherein the parking controller is configured to: maintain the parking lock member in the down state even after a first reserved vehicle has left the parking space when it is predicted that switching parking occurs in which a second reserved vehicle enters the parking space immediately after the first reserved vehicle leaves the parking space; and predict that the switching parking will occur when the approach sensor detects approach of the second reserved vehicle during a period in which the parking sensor detects that the first reserved vehicle is parked in the parking space.

In this case, the parking controller may be configured to change the parking lock member to the up state if the vehicle leaves the parking space when the occurrence of the switching parking is not predicted.

In addition, the parking management system may further comprises a parking lock unit, wherein the parking lock unit may include: the parking lock member; a vehicle sensor configured to detect presence or absence of the vehicle in the parking space; and a unit controller configured to control a state of the parking lock member based on a request which is input via an API, wherein the parking controller may be configured to transmit a down state maintaining request to the unit controller through an API when it is predicted that the switching parking will occur, and the unit controller may be configured to: maintain the parking lock member in the down state even after the vehicle sensor detects that the vehicle has left the parking space during a period in which the down state maintaining request is valid; and change the parking lock member from the down state to the up state when the vehicle sensor detects that the vehicle has left the parking space during a period in which the down state maintaining request is cancelled.

Further, the parking controller may be configured to cancel the down state maintaining request when the leaving of the first reserved vehicle is not confirmed even after an available time of the first reserved vehicle has elapsed after outputting the down state maintaining request.

Further, the approach sensor may be configured to detect that the vehicle has passed a predetermined detection point, the detection point may be a position at which a movement time of the vehicle from the detection point to the parking space is equal to or longer than a transition time required for the parking lock member to change from the up state to the down state, and when no other vehicle may be parked in the parking space, the parking controller may be configured to start the change of the parking lock member to the down state at a timing when the approach sensor detects the approach of the vehicle.

According to the parking management system disclosed herein, switching parking can be smoothly performed.

BRIEF DESCRIPTION OF DRAWINGS

Embodiment(s) of the present disclosure will be described based on the following figures, wherein.

DESCRIPTION OF EMBODIMENT

Figure 1:
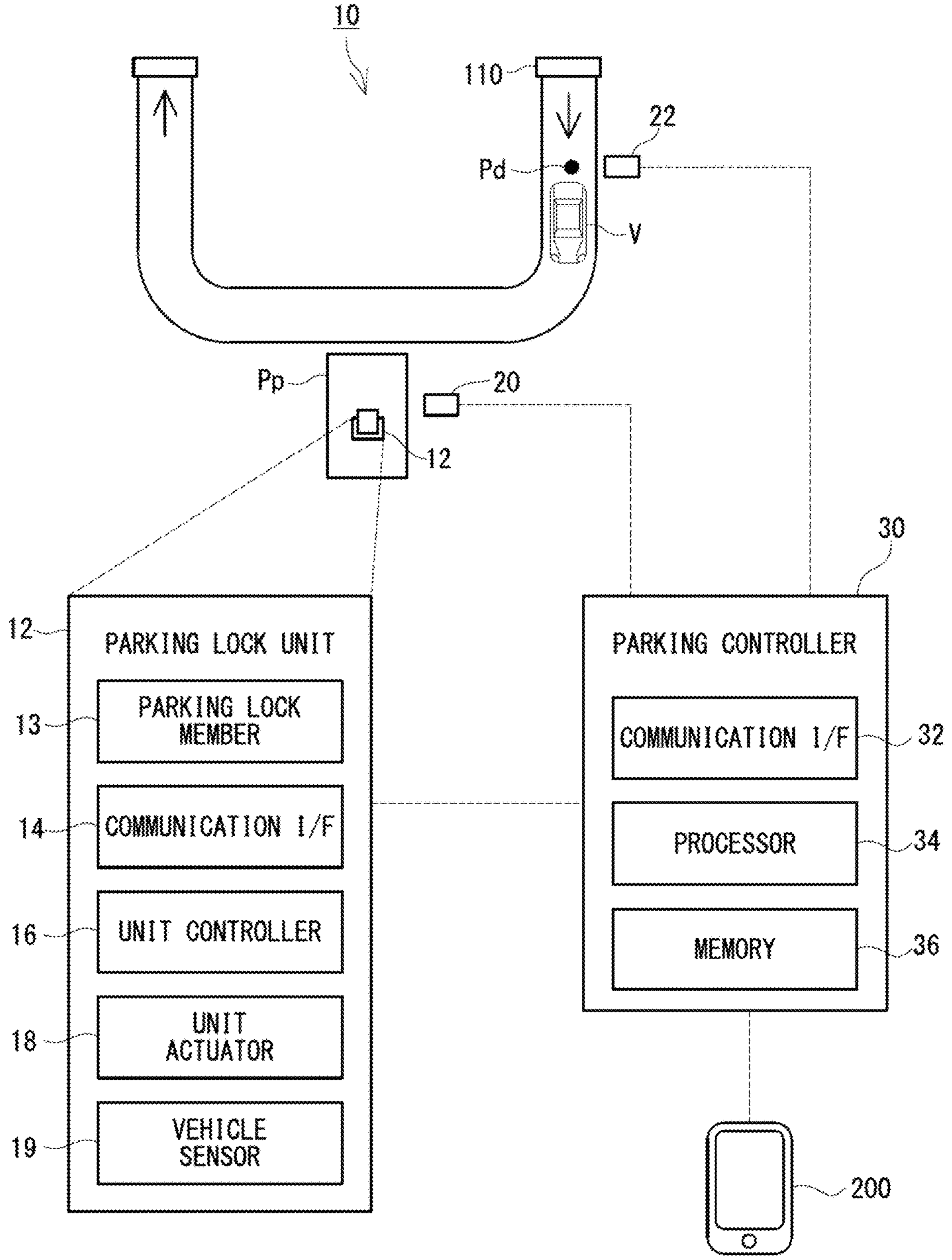
FIG. 1 is a schematic diagram illustrating a configuration of a parking management system.

Hereinafter, a configuration of the parking management system 10 will be described with reference to the drawings. FIG. 1 is a schematic diagram illustrating a configuration of a parking management system 10. The parking management system 10 manages a parking state of the vehicle V in a predetermined parking space Pp. When the user wants to use the parking space Pp, the user reserves the parking space Pp through the information terminal in advance. Although only one parking space Pp is illustrated in FIG. 1, a plurality of parking spaces Pp may be provided. At the time of reservation for use, the user notifies the parking controller 30 to be described later of identification information of the parking space Pp to be used and a time period to be used.

A parking lock unit 12 is provided in the parking space Pp. The parking lock unit 12 is a general-purpose component for switching the availability of the parking space Pp. The parking lock unit 12 has a parking lock member 13 capable of moving up and down. The parking lock member 13 has an arm shape or a flap shape fixed to the ground. In addition, the parking lock member 13 can be changed between an up state Su in which it rises from the ground and a down state Sd in which it falls along the ground. In the up state Su, the upper end of the parking lock member 13 is sufficiently higher than the floor surface height of a general vehicle V. Therefore, when the parking lock member 13 is in the up state Su, entry of the vehicle V into the parking space Pp is inhibited. Further, in the down state Sd, the upper end of the parking lock member 13 is sufficiently lower than the floor surface height of a general vehicle V. Therefore, when the parking lock member 13 is in the down state Sd, the vehicle V can enter the parking space Pp. The parking lock unit 12 switches whether to park the vehicle V in the parking space Pp by switching the vertical movement of the parking lock member 13 based on the request input via API (application programming interface).

The parking lock unit 12 further includes a communication I/F 14, a unit controller 16, a unit actuator 18, and a vehicle sensor 19. The unit actuator 18 raises and lowers the parking lock member 13, and is an electrically controllable actuator. The unit actuator 18 includes, for example, a motor or a hydraulic cylinder or an electromagnetic cylinder as a power source.

The vehicle sensor 19 detects the presence or absence of the vehicle V in the parking space Pp. For example, the vehicle sensor 19 may be an ultrasonic sensor that detects the presence or absence of an object on the upper side of the parking lock unit 12, a camera that captures an image of the parking space Pp, or a load sensor that detects a load acting on the parking space Pp. The detection result of the vehicle sensor 19 is output to the unit controller 16. As described above, the parking lock unit 12 is a general-purpose product, and is a product that is assumed to be used in a parking facility that does not have the parking sensor 20 described below. The vehicle sensor 19 is provided to properly operate the parking lock unit 12 even in a parking facility without the parking sensor 20.

The communication I/F 14 transmits and receives data to and from the parking controller 30. The specific form of the communication I/F 14 is not particularly limited as long as data can be appropriately transmitted and received. Therefore, the communication I/F 14 may transmit and receive data via a communication cable, or may have an antenna for transmitting and receiving a radio signal.

The unit controller 16 controls driving of the unit actuator 18. The unit controller 16 is physically a computer having a processor and a memory. A control program for the unit actuator 18 is installed in the memory of the unit controller 16. The control program provides an API that receives an external request, executes processing according to the request, and returns a processing result to the outside.

When a request for exception processing is not received, the control program of the unit actuator 18 changes the parking lock unit 12 from the down state Sd to the up state Su at a timing at which the detection result of the vehicle sensor 19 is switched from "with vehicle V" to "without vehicle V", that is, at a timing at which exit of the vehicle Vis detected. The control program of the unit actuator 18 receives at least a down request, an up request, a down state maintaining request, and a state notification request.

The down request is a request for changing the parking lock unit 12 from the up state Su to the down state Sd. The up request is a request for changing the parking lock unit 12 from the down state Sd to the up state Su. The down state maintaining request is a request for maintaining the parking lock unit 12 in the down state Sd even when the exit of the vehicle Vis detected. The state notification request is a request for notifying the transmission source of the request of the state of the parking lock unit 12, that is, whether the state is the down state Sd, the up state Su, or the transition state. Note that the transition state is a state in which transition is being made from the down state Sd to the up state Su or from the up state Su to the down state Sd. The unit controller 16 drives the unit actuator 18 in accordance with a request received from the outside.

The parking management system 10 further includes a parking sensor 20, an approach sensor 22, and a parking controller 30. The parking sensor 20 detects a parking state of the vehicle V in the parking space Pp. The parking sensor 20 is, for example, a camera that captures an image of the parking space Pp. The parking controller 30 specifies the presence or absence of the vehicle V in the parking space Pp and identification information of the parked vehicle V based on the image acquired by the parking sensor 20. The identification information of the vehicle Vis, for example, a vehicle number described in a license plate of the vehicle V. The parking controller 30 collates the identified identification information of the vehicle V with the use reservation information.

The approach sensor 22 detects approach of the vehicle V to the parking space Pp. The approach sensor 22 is, for example, a camera that captures an image of the vehicle V passing through a predetermined detection point Pd. The detection point Pd is provided on a route from the entrance 110 of the parking facility toward the parking space Pp. The detection point Pd is set in consideration of the transition time Tc necessary for the parking lock member 13 to transition from the up state Su to the down state Sd. Specifically, the detection point Pd is a point at which a movement time Tm assumed when the vehicle V moves from the detection point Pd to the parking space Pp is equal to or longer than the transition time Tc. That is, when the moving distance from the detection point Pd to the parking space Pp is L and the assumed speed of the vehicle Vis S, the detection point Pd is a point satisfying $L/S \geq Tc$. A plurality of detection points Pd and thus a plurality of approach sensor 22 may be provided. The parking controller 30 specifies the presence or absence of the vehicle V approaching the parking space Pp and identification information of the approaching vehicle V based on the image acquired by the approach sensor 22. Then, the parking controller 30 outputs a down request to the parking lock unit 12 at a timing when the reserved vehicle Vr is detected at the detection point Pd. Thus, when the reserved vehicle Vr reaches the parking space Pp, the parking lock member 13 is completely changed to the down state Sd, and the reserved vehicle Vr can smoothly enter the parking space Pp.

The parking controller 30 receives a reservation for use of the parking space Pp and controls the state of the parking lock member 13. The parking controller 30 is physically a computer having a communication I/F 32, a processor 34, and a memory 36. In FIG. 1, the parking controller 30 is illustrated as a single computer, but the parking controller 30 may be configured by combining a plurality of computers physically separated from each other.

The communication I/F 32 transmits and receives data to and from the parking lock unit 12 and the external communication terminal 200. The communication I/F 32 may transmit and receive data via a communication cable, or may include an antenna for transmitting and receiving a radio signal. The communication terminal 200 is a terminal operated by a user, and is, for example, a smartphone or a personal computer. When the user operates the communication terminal 200, information related to the reservation of use of the parking space Pp is transmitted to the parking controller 30.

The parking controller 30 manages the use reservation of the parking space Pp based on the reservation application transmitted from the communication terminal 200. That is, the parking controller 30 stores the identification information of the parking space Pp, the identification information of the reserved vehicle Vr, and the use time zone in association with each other as reservation information. The parking controller 30 controls the operation of the parking lock member 13 by comparing the reservation information with the identification information of the vehicle V detected by the parking sensor 20 and the approach sensor 22. In addition, the parking controller 30 determines the parking state of the vehicle V from the detection results of the sensors 20 and 22, and also executes billing processing according to the parking state.

Figure 2:
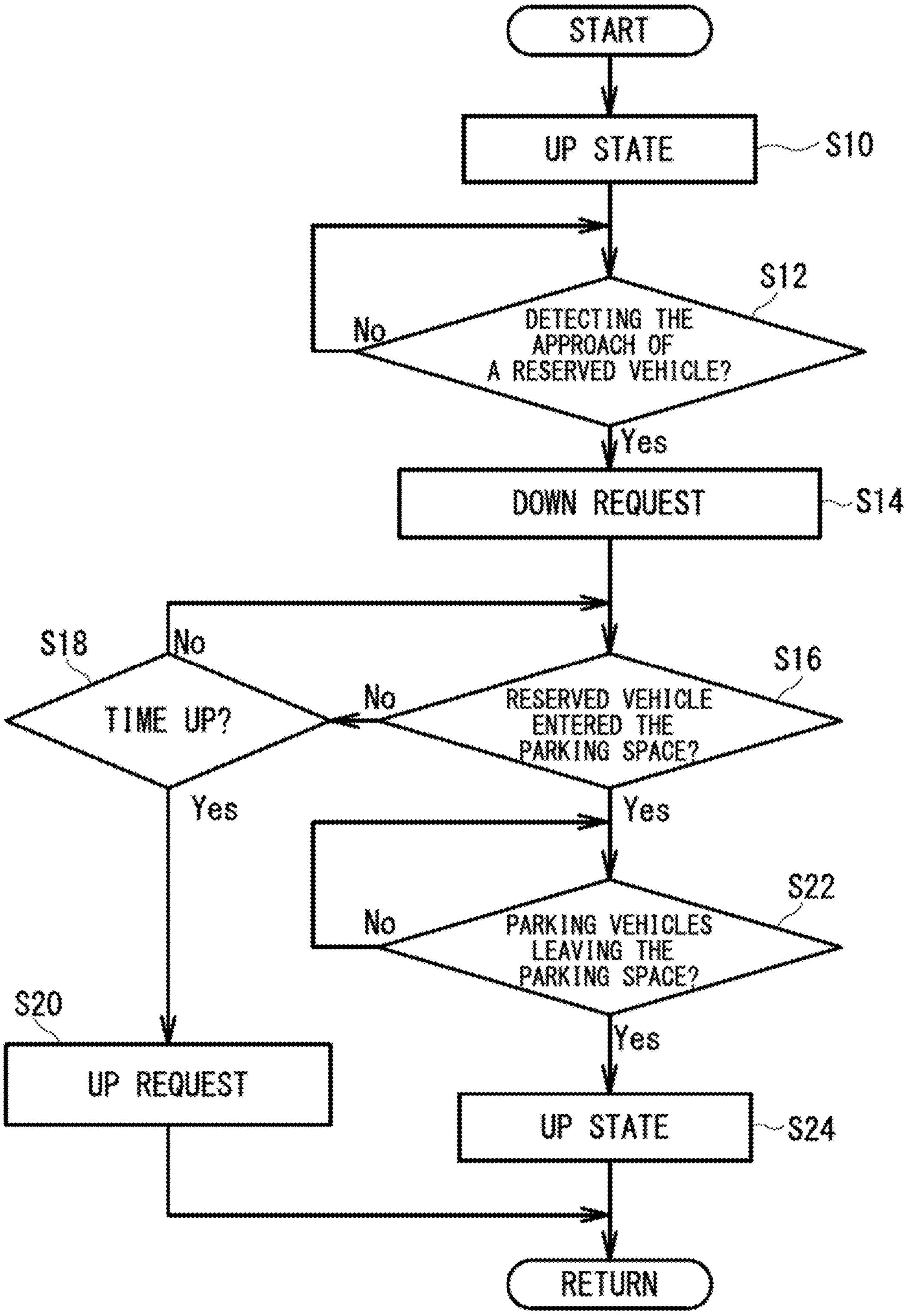
FIG. 2 is a flowchart showing a flow of operation control of a parking lock member.

Next, a flow of operation control of the parking lock member 13 in the parking management system 10 will be described. FIG. 2 is a flowchart showing a flow of operation control of the parking lock member 13. When the vehicle Vis not parked in the parking space Pp, in principle, the parking lock member 13 is in the up state Su (S10). Since the parking lock member 13 is in the up state Su, it is possible to prevent a vehicle that is not reserved in advance from being parked in the parking space Pp.

The parking controller 30 determines whether or not the reserved vehicle Vr has approached based on the image received from the approach sensor 22 (S12). Here, the reserved vehicle Vr is a vehicle in which the current time is included in the available time zone of the reserved vehicle Vr. Therefore, even if the use of the parking space Pp is reserved, the vehicle that has reserved the use in a time zone completely different from the current time does not correspond to the "reserved vehicle Vr" in step S12.

The "available time zone" is a time zone in which a margin time of 0 or more is added before and after the reserved time zone. For example, in the case of reserving a time period from 13 o'clock to 14 o'clock, the available time zone is a time period from a time point retraced from 13 o'clock by a first margin time to a time point advanced from 14 o'clock by a second margin time. The margin time is not particularly limited as long as it is 0 or more, but is usually selected between 0 and 15 minutes. The first margin time and the second margin time may be the same or different from each other. Therefore, when the margin time is larger than 0, the available time zone of one reserved vehicle Vr may overlap the available time zones of the other reserved vehicles.

When the approach of the reserved vehicle Vr is detected (Yes in S12), the parking controller 30 transmits a down request to the unit controller 16 (S14). Thus, the unit controller 16 changes the parking lock member 13 from the up state Su to the down state Sd.

After transmitting the down request, the parking controller 30 checks whether or not the reserved vehicle Vr has entered the parking space Pp based on the image received from the parking sensor 20 (S16). When the entry of the reserved vehicle Vr cannot be confirmed within the predetermined allowable time (Yes in S18), the parking controller 30 determines that the reserved vehicle Vr has moved to another location, and transmits an up request to the unit controller 16 (S20). Accordingly, it is possible to prevent an unreserved vehicle from being uninterruptedly parked in the parking space Pp.

On the other hand, when entry of the reserved vehicle Vr is detected within the allowable time (Yes in S16), the parking controller 30 checks whether or not the reserved vehicle Vr leaves the parking space Pp based on the image received from the parking sensor 20 (S22). When the exit of the reserved vehicle Vr is confirmed (Yes in S22), the parking controller 30 executes a billing process or the like as necessary. When the vehicle sensor 19 mounted on the parking lock unit 12 detects the exit of the reserved vehicle Vr, the unit controller 16 changes the parking lock member 13 from the down state Sd to the up state Su (S24). Thereafter, the same processing is repeatedly executed.

Figure 3:
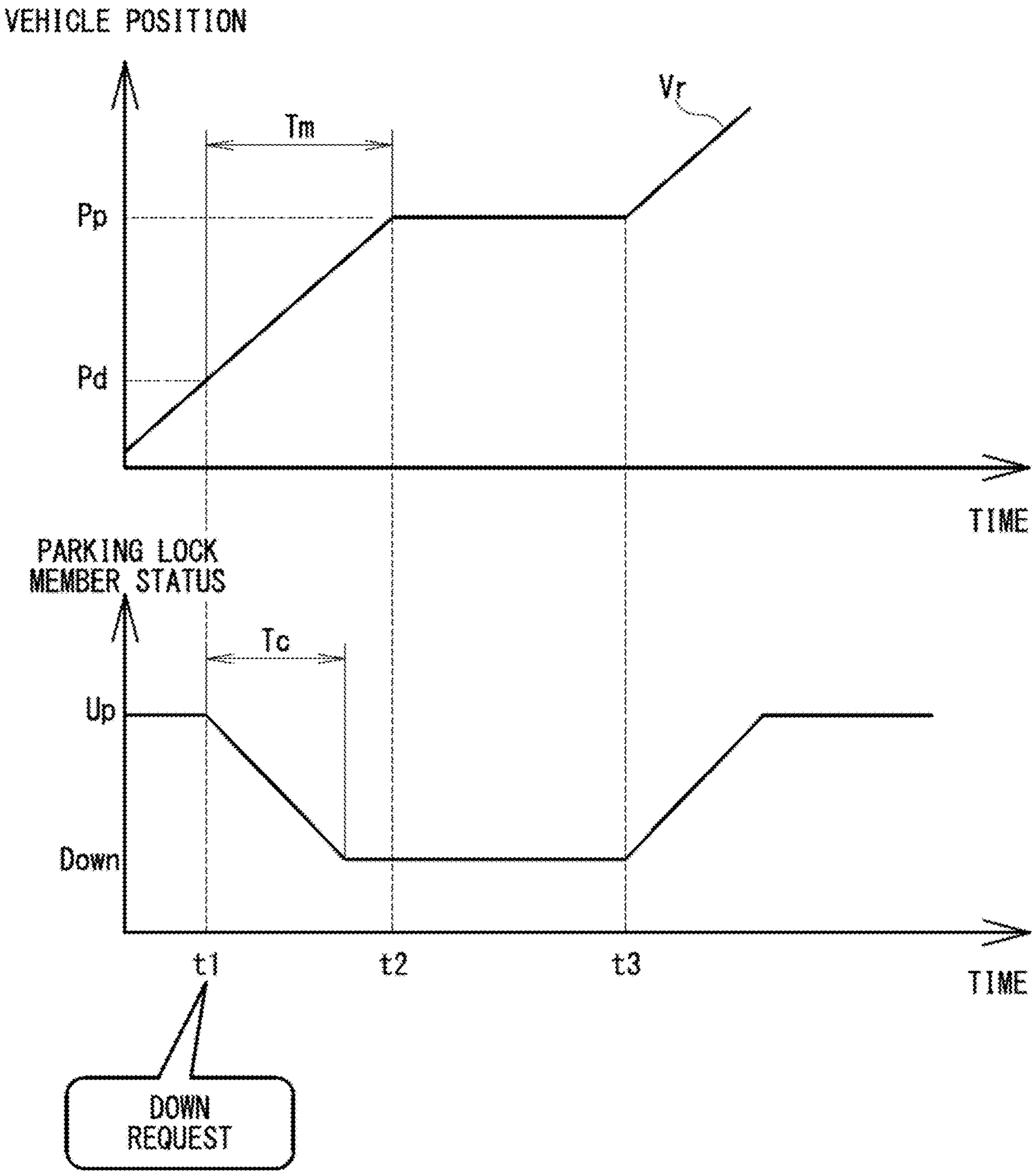
FIG. 3 is a graph showing an example of a temporal change between a position of a reserved vehicle and a state of a parking lock member.

FIG. 3 is a graph showing an example of a temporal change between the position of the reserved vehicle Vr and the state of the parking lock member 13. In FIG. 3, the upper row shows the position of the reserved vehicle Vr, and the lower row shows the state of the parking lock member 13.

In the example of FIG. 3, the reserved vehicle Vr passes through the detection point Pd at time t1. The parking controller 30 transmits a down request to the unit controller 16 at this timing. As a result, the parking lock member 13 changes from the up state Su to the down state Sd. Here, the transition time Tc required for this change is shorter than the movement time Tm during which the reserved vehicle Vr moves from the detection point Pd to the parking space Pp. Therefore, at time t2 when the reserved vehicle Vr reaches the parking space Pp, the parking lock member 13 is completely changed to the down state Sd. Accordingly, the reserved vehicle Vr can smoothly enter the parking space Pp without caring about the parking lock member 13.

Thereafter, at time t3, the reserved vehicle Vr leaves the parking space Pp. When the vehicle sensor 19 of the parking lock unit 12 detects this exit, the unit controller 16 automatically changes the parking lock member 13 from the down state Sd to the up state Su. This effectively prevents an unrelated vehicle V that is not reserved from entering the parking space Pp.

Figure 4:
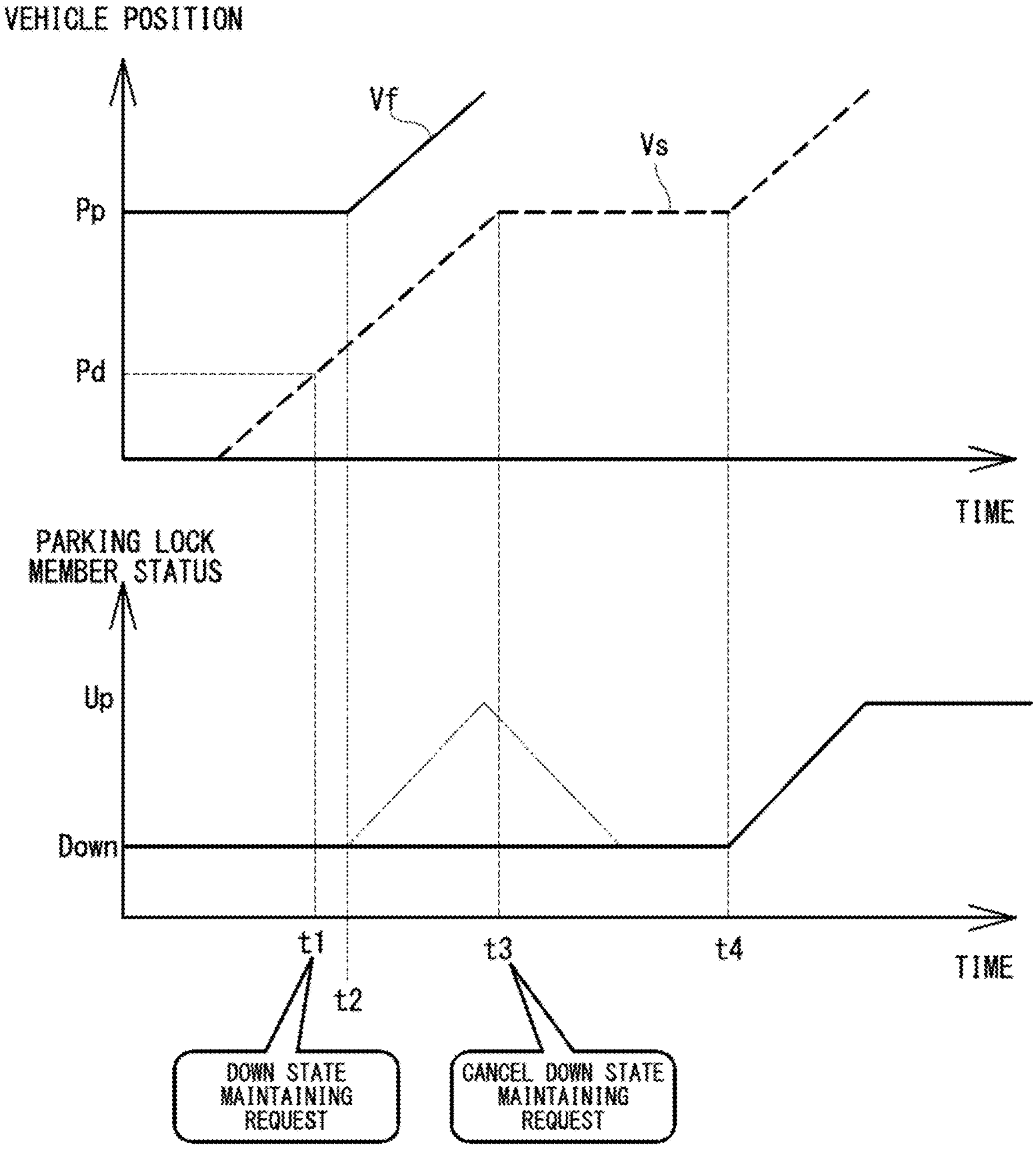
FIG. 4 is a diagram showing the position of the vehicle and the state of the parking lock unit when the second reserved vehicle enters the vehicle immediately after the first reserved vehicle leaves the vehicle.

Depending on the reservation situation, switching parking may occur in which the next vehicle V enters the vehicle immediately after one vehicle V leaves the vehicle. In this case, when the state of the parking lock member 13 is sequentially switched, the next vehicle V may not be able to smoothly enter the vehicle. This will be described with reference to FIG. 4. FIG. 4 is a diagram illustrating the position of the vehicle and the state of the parking lock unit 12 when the second reserved vehicle Vs enters the parking space immediately after the first reserved vehicle Vf leaves the parking space.

In the upper part of FIG. 4, a solid line indicates the position of the first reserved vehicle Vf, and a broken line indicates the position of the second reserved vehicle Vs. In the example of FIG. 4, the second reserved vehicle Vs passes through the detection point Pd at time t1. At this time, the first reserved vehicle Vf is still in the parking space Pp. Thereafter, the first reserved vehicle Vf leaves the parking space Pp at time t2, and the second reserved vehicle Vs enters the parking space Pp at time t3.

At this time, according to the operation flow of FIG. 2, the parking lock unit 12 is changed from the down state Sd to the up state Su at the time t2 at which the first reserved vehicle Vf exits as indicated by the two-dot chain line in the lower part of FIG. 4. In this case, when the second reserved vehicle Vs reaches the parking space Pp, since the parking lock unit 12 is not completely lowered, the second reserved vehicle Vs cannot smoothly enter the parking space Pp.

Therefore, in the present example, the parking controller 30 predicts that switching parking occurs when approaching of the second reserved vehicle Vs is detected during a period in which parking of the first reserved vehicle Vf is detected. When the occurrence of the switching parking is predicted, the parking controller 30 transmits a down state maintaining request to the unit controller 16. By receiving the down state maintaining request, the unit controller 16 keeps the parking lock member 13 in the down state Sd even after the exit is detected.

In the example of FIG. 4, the time t1 at which the approach of the second reserved vehicle Vs is detected is the parking period of the first reserved vehicle Vf and the available time period of the second reserved vehicle Vs. In this case, the parking controller 30 transmits a down state maintaining request to the unit controller 16 at time t1. As a result, as indicated by the solid line in the lower part of FIG. 4, the parking lock unit 12 remains in the down state Sd even after the time t2 at which the first reserved vehicle Vf exits. As a result, the second reserved vehicle Vs can smoothly enter the parking space Pp at the time t3. If the entrance of the second reserved vehicle Vs is confirmed, the parking controller 30 transmits the cancellation of the down state maintaining request to the unit controller 16.

Figure 5:
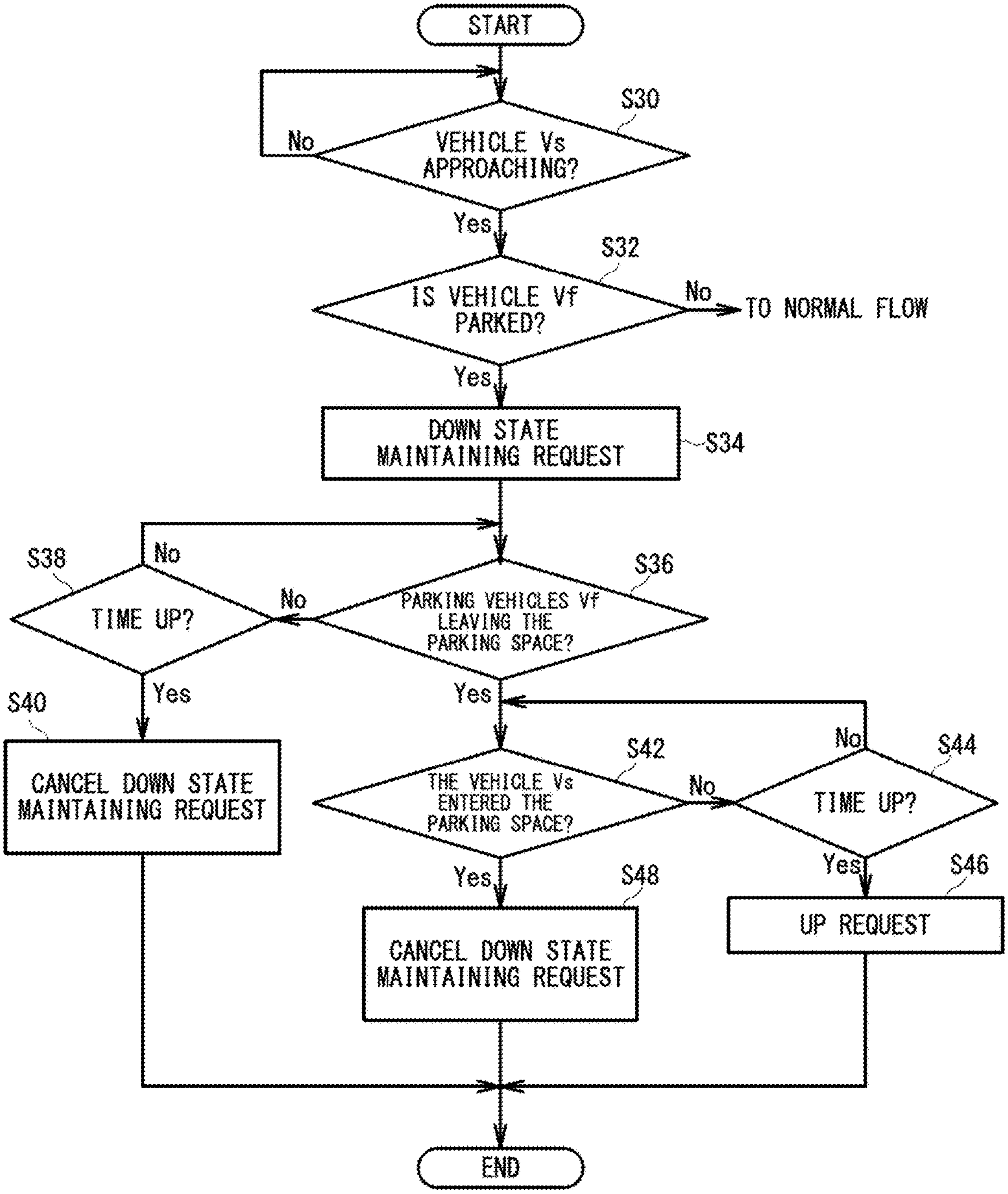
FIG. 5 is a flowchart showing a flow of operation control of a parking lock member in switching parking.

FIG. 5 is a flowchart showing the flow of the operation control of the parking lock member 13 in the switching parking. As illustrated in FIG. 5, when the approach of the second reserved vehicle Vs is detected and the first reserved vehicle Vf is parked in the parking space Pp (Yes in S30 and Yes in S32), the parking controller 30 transmits a down state maintaining request to the unit controller 16 (S34). Thereafter, the parking controller 30 monitors whether or not the first reserved vehicle Vf has left the parking space Pp (S36). Then, when the first reserved vehicle Vf has left the parking space Pp (Yes in S36), the parking controller 30 subsequently monitors whether or not the second reserved vehicle Vs is entered the parking space Pp (S42). When the second reserved vehicle Vs enters within the allowable time (Yes in S42), the parking controller 30 cancels the down state maintaining request (S48).

On the other hand, when the first reserved vehicle Vf does not leave the parking space even if the first reserved vehicle Vf exceeds the available time zone (Yes in S38), the parking controller 30 cancels the down state maintaining request (S40). That is, when the first reserved vehicle Vf continues to be parked beyond the available time zone, it can be determined that the exit time cannot be predicted and switching parking by the first reserved vehicle Vf and the second reserved vehicle Vs does not occur. Therefore, in this case, the parking controller 30 cancels the down state maintaining request. In this case, the second reserved vehicle Vs is provided with alternative services such as cancellation of the use reservation and change to another parking space Pp in accordance with the user's desire of the second reserved vehicle Vs. When the entrance of the second reserved vehicle Vs cannot be confirmed within the predetermined allowable time after the first reserved vehicle Vf exits (Yes in S44), the parking controller 30 transmits an up request to the unit controller 16 (S46).

Figure 6:
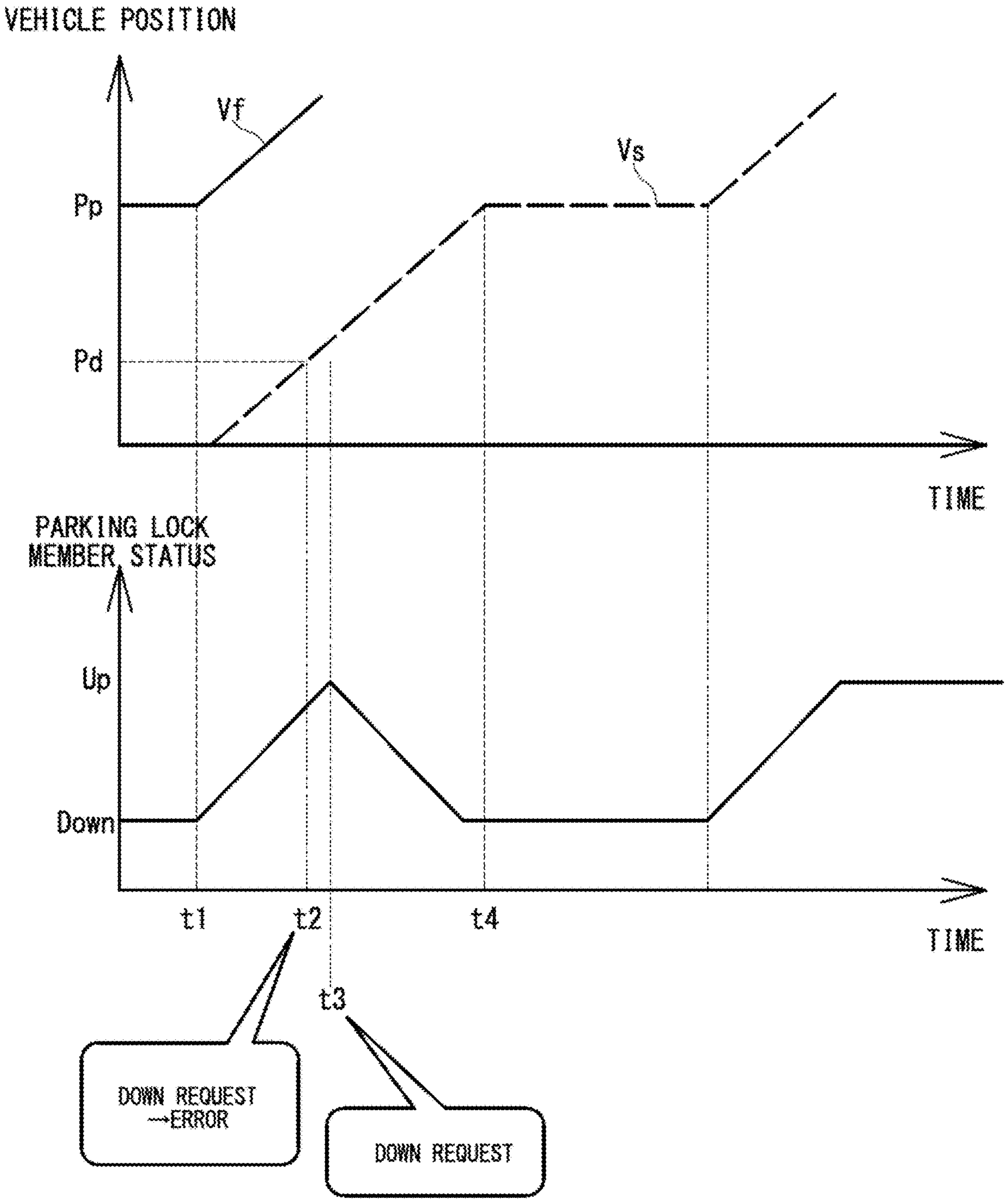
FIG. 6 is a diagram showing the position of the vehicle and the state of the parking lock unit when the second reserved vehicle approaches immediately after the first reserved vehicle leaves the parking space.

In the example of FIG. 4, the approach of the second reserved vehicle Vs is detected during the parking period of the first reserved vehicle Vf. However, as shown in FIG. 6, the approach of the second reserved vehicle Vs may be detected immediately after the first reserved vehicle Vf exits. In the example of FIG. 6, the first reserved vehicle Vf exits at time t1, and the second reserved vehicle Vs passes through the detection point Pd at time t2. In this case, the unit controller 16 starts raising the parking lock unit 12 at time t1 when the exit of the first reserved vehicle Vf is detected. On the other hand, the parking controller 30 transmits a down request to the unit controller 16 at time t2 when the approach of the second reserved vehicle Vs is detected.

Here, the unit controller 16 of the present example is configured not to accept a new request for lifting and lowering during the transition period in which the parking lock member 13 is lifting and lowering. Therefore, even if the parking controller 30 transmits the down request at time t2, an error occurs. Therefore, when the down request is an error, the parking controller 30 periodically transmits a state notification request to the unit controller 16 to confirm the state of the parking lock member 13. When the parking lock member 13 enters the up state Su, the parking controller 30 again transmits a down request to the unit controller 16.

In the case of FIG. 6, the parking controller 30 transmits a down request to the unit controller 16 at time t3 when the parking lock unit 12 is in the up state Su. Accordingly, the parking lock unit 12 immediately starts the lowering of the parking lock member 13 after the completion of the raising of the parking lock member 13. Accordingly, the second reserved vehicle Vs can enter the parking space Pp without waiting time or with a small waiting time.

As is clear from the above description, according to the operation control of FIG. 5, in a case where switching parking occurs, unnecessary lifting and lowering of the parking lock member 13 can be suppressed, so that the second reserved vehicle Vs can smoothly enter the parking space Pp. As shown in FIG. 6, when the down request is an error, the parking controller 30 of the present example outputs the down request again after the parking lock unit 12 stops moving. Accordingly, it is possible to eliminate or reduce the waiting time of the second reserved vehicle Vs. As is clear from the above description, in the present example, a general-purpose lock unit having an API function is used as the parking lock unit 12. Therefore, it is not necessary to design the detailed control related to the lifting and lowering of the parking lock member 13 (for example, the speed control of the unit actuator 18) again, and the time required for constructing the parking management system 10 can be reduced.

Note that all of the configurations described above are examples, and other configurations may be changed as long as the configuration described in the claims is provided. For example, in the above description, the general-purpose parking lock unit 12 is used, and the parking controller 30 indirectly controls the operation of the parking lock member 13 via the API. However, the parking controller 30 may directly control the parking lock member 13. In this case, the unit controller 16 and the vehicle sensor 19 are eliminated, and the parking controller 30 directly controls the unit actuator 18. The parking sensor 20 and the approach sensor 22 are not limited to cameras, and may have other configurations. For example, the parking sensor 20 and the approach sensor 22 may be a communication I/F that performs vehicle-to-vehicle communication with the vehicle V.

REFERENCE SIGNS LIST

10 parking management system, 12 parking lock unit, 13 parking lock member, 14 communication I/F, 16 unit controller, 18 unit actuator, 19 vehicle sensor, 20 parking sensor, 22 approach sensor, 30 parking controller, 32 communication I/F, 34 processor, 36 memory, 110 entrance, 200 communication terminal, Pd detection point, Pp parking space, V vehicle.

The invention claimed is:

1. A parking management system comprising:

a parking lock member provided in a parking space and configured to be changeable between an up state in which entry of a vehicle is inhibited and a down state in which the entry of the vehicle is permitted;

a parking controller configured to manage a reservation to use the parking space and to control a state change of the parking lock member;

a parking lock unit;

a parking sensor configured to detect presence or absence of the vehicle in the parking space; and an approach sensor configured to detect approach of the vehicle to the parking space, wherein the parking controller is configured to:

maintain the parking lock member in the down state even after a first reserved vehicle has left the parking space when it is predicted that switching parking occurs in which a second reserved vehicle enters the parking space immediately after the first reserved vehicle leaves the parking space;

predict that the switching parking will occur when the approach sensor detects approach of the second reserved vehicle during a period in which the parking sensor detects that the first reserved vehicle is parked in the parking space;

change the parking lock member to the up state when the vehicle leaves the parking space when the occurrence of the switching parking is not predicted wherein the parking lock unit includes:

the parking lock member;

a vehicle sensor configured to detect presence or absence of the vehicle in the parking space; and a unit controller configured to control a state of the parking lock member based on a request which is input via an API;

wherein the parking controller is configured to transmit a down state maintaining request to the unit controller through an API when it is predicted that the switching parking will occur, and wherein the unit controller is configured to:

maintain the parking lock member in the down state even after the vehicle sensor detects that the vehicle has left the parking space during a period in which the down state maintaining request is valid; and change the parking lock member from the down state to the up state when the vehicle sensor detects that the vehicle has left the parking space during a period in which the down state maintaining request is cancelled.

2. The parking management system according to claim 1, wherein the parking controller is configured to cancel the down state maintaining request when the leaving of the first reserved vehicle is not confirmed even after an available time of the first reserved vehicle has elapsed after outputting the down state maintaining request.

3. The parking management system according to claim 1, wherein the approach sensor is configured to detect that the vehicle has passed a predetermined detection point, the detection point is a position at which a movement time of the vehicle from the detection point to the parking space is equal to or longer than a transition time required for the parking lock member to change from the up state to the down state, and when no other vehicle is parked in the parking space, the parking controller is configured to start the change of the parking lock member to the down state at a timing when the approach sensor detects the approach of the vehicle.

4. A parking management system comprising:

a parking lock member provided in a parking space and configured to be changeable between an up state in which entry of a vehicle is inhibited and a down state in which the entry of the vehicle is permitted;

a parking controller configured to manage a reservation to use the parking space and to control a state change of the parking lock member;

a parking sensor configured to detect presence or absence of the vehicle in the parking space; and an approach sensor configured to detect approach of the vehicle to the parking space, wherein the parking controller is configured to:

maintain the parking lock member in the down state even after a first reserved vehicle has left the parking space when it is predicted that switching parking occurs in which a second reserved vehicle enters the parking space immediately after the first reserved vehicle leaves the parking space; and predict that the switching parking will occur when the approach sensor detects approach of the second reserved vehicle during a period in which the parking sensor detects that the first reserved vehicle is parked in the parking space wherein the approach sensor is configured to detect that the vehicle has passed a predetermined detection point, wherein the detection point is a position at which a movement time of the vehicle from the detection point to the parking space is equal to or longer than a transition time required for the parking lock member to change from the up state to the down state, and wherein when no other vehicle is parked in the parking space, the parking controller is configured to start the change of the parking lock member to the down state at a timing when the approach sensor detects the approach of the vehicle.

* * * * *